United States Patent
Sween et al.

(10) Patent No.: US 7,610,661 B2
(45) Date of Patent: Nov. 3, 2009

(54) CORD MANAGEMENT DEVICE, AND CORD MANAGEMENT SYSTEM COMPRISING SAME

(75) Inventors: Barry Sween, Santa Monica, CA (US); David Kleeman, Marina Del Rey, CA (US); Vijendra Nalwad, Newbury Park, CA (US)

(73) Assignee: Belkin International, Inc., Compton, CA (US)

( * ) Notice: Subject to any disclaimer, the term of this patent is extended or adjusted under 35 U.S.C. 154(b) by 133 days.

(21) Appl. No.: 11/349,765

(22) Filed: Feb. 7, 2006

(65) Prior Publication Data

US 2007/0180665 A1 Aug. 9, 2007

(51) Int. Cl.
*F16G 11/00* (2006.01)
(52) U.S. Cl. .................................. 24/129 R
(58) Field of Classification Search ............ 24/18, 24/115 R, 129 R, 130, 129 B, 129 D, 129 A; 242/405.1, 402, 388.2, 388, 388.1; 381/370, 381/374; 206/589
See application file for complete search history.

(56) References Cited

U.S. PATENT DOCUMENTS

| | | | | |
|---|---|---|---|---|
| 1,275,735 A | * | 8/1918 | Phillips | 242/405.1 |
| 2,533,341 A | * | 12/1950 | Alfano | 242/388 |
| 3,934,838 A | * | 1/1976 | D'Amico | 242/405.1 |
| 4,802,638 A | | 2/1989 | Burger | |
| 5,458,241 A | | 10/1995 | Brown | |
| 6,497,382 B2 | * | 12/2002 | King | 242/405.2 |
| 2002/0084373 A1 | | 7/2002 | King | |

FOREIGN PATENT DOCUMENTS

| | | |
|---|---|---|
| DE | 32 33 375 A1 | 3/1984 |
| FR | 2 608 851 A | 6/1988 |
| GB | 2 125 370 A | 3/1984 |
| JP | 59 043698 A | 3/1984 |
| JP | 05 111087 A | 4/1993 |
| JP | 2002 354640 A | 12/2002 |

OTHER PUBLICATIONS

Sony—Sports Series Fontopia Ear-Bud Stereo Headphones; http://edu.sony.biz/is-bin/+INTERSHOP.enfinity.eCS.Store/en/-/USD/BB_DisplayProductInformation-...; retrieved from the Internet on Nov. 28, 2005, 2 pages.
Sumajin—Smartwrap Stereo Earphone Cord Manager; http://www.sumajin.com/online.htm; retrieved from the Internet on Nov. 22, 2005, 11 pages.

* cited by examiner

*Primary Examiner*—James R Brittain
(74) *Attorney, Agent, or Firm*—Bryan Cave LLP

(57) ABSTRACT

A cord management device comprises a body (110) having a first end (111), a second end (112), a perimeter (113), and an interior (114) bounded by the perimeter. A cord (210) that is to be managed may be wrapped around the body of the cord management device in such a way as to control a length of a portion (211, 212) of the cord that is able to hang freely, thus protecting the entire cord. The cord management device further comprises an aperture (120) spaced apart from the perimeter and extending through the interior of the body, and still further comprises a recess (140) in the interior of the body capable of receiving and storing an object (410) attached to the cord. A cord management system including the cord management device is also disclosed.

23 Claims, 2 Drawing Sheets

CORD MANAGEMENT DEVICE, AND CORD MANAGEMENT SYSTEM COMPRISING SAME

FIELD OF THE INVENTION

This invention relates generally to the management of cords such as cords of the type that are attached to headphones, battery charging devices, and the like, and relates more particularly to a cord management device capable of receiving a portion of an accessory that is attached to the cord.

BACKGROUND OF THE INVENTION

The increasing popularity and availability of portable electronic devices has resulting in an increasing demand for cord management solutions for such portable electronic devices, which include MP3 and other music players, cell phones, personal digital assistants (PDAs), and the like. Left unmanaged, the various headphone cords, power cords, and other cords used by such portable electronic devices and the like tend to become tangled and disorganized, leading to an unsightly and potentially unsafe situation in which such cords can become, for example, caught on other objects, broken, or disengaged from the portable electronic device. Another cord management issue that arises with portable electronic devices is the management of the various hardware that is connected at the end of the cord, such as headphone ear buds, power cord connector tips, and the like. Accordingly, there exists a need for a cord management device that offers a simple and effective management solution for cords and their associated hardware.

BRIEF DESCRIPTION OF THE DRAWINGS

The invention will be better understood from a reading of the following detailed description, taken in conjunction with the accompanying figures in the drawings in which.

Figure 1:
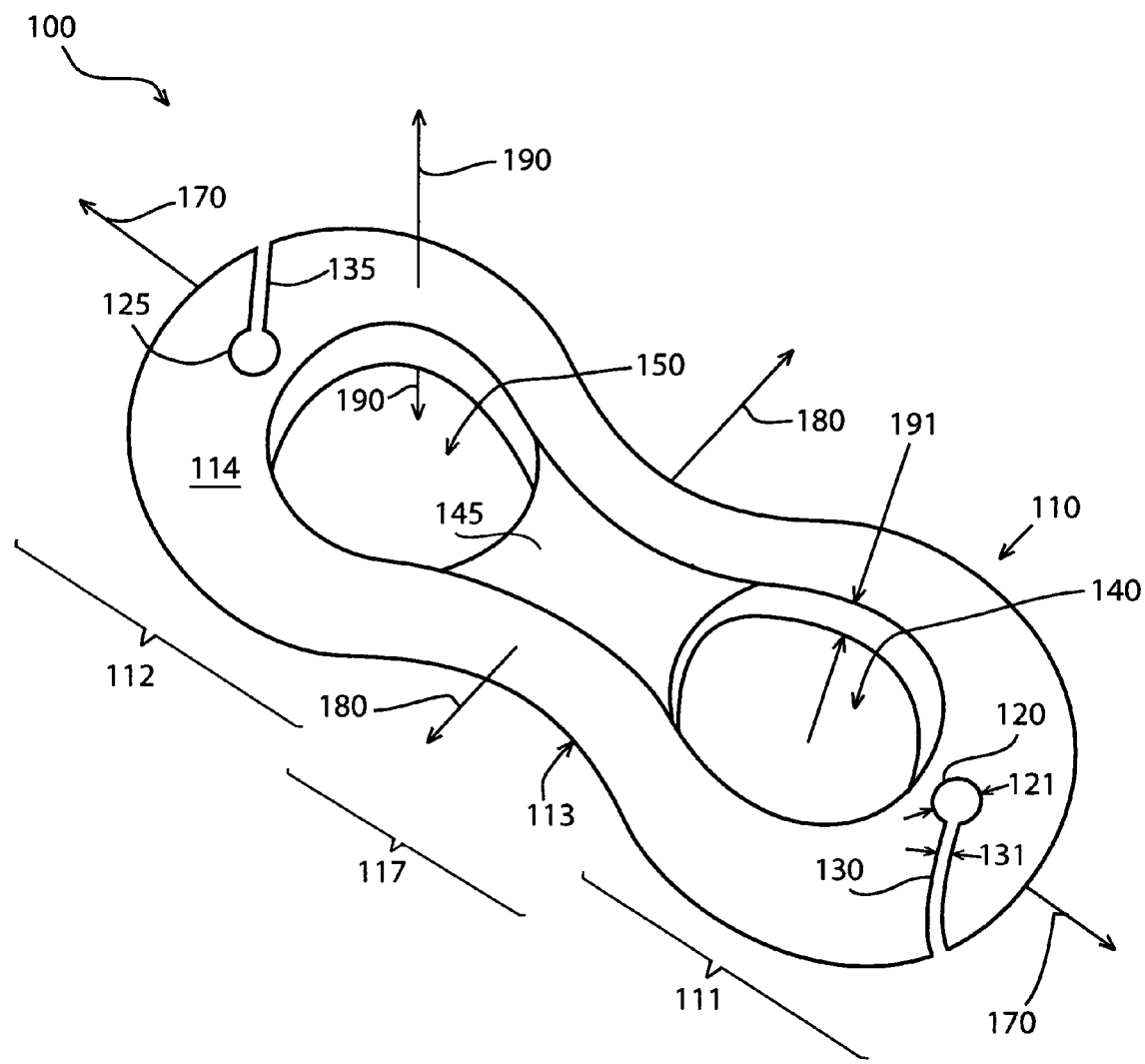
FIG. 1 is a perspective view, on a larger scale than the other figures herein, of a cord management device according to an embodiment of the invention.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical, mechanical, or other manner. The phrase "adjacent to," as used herein, encompasses the meanings of "next to," "close to," "lying near," "adjoining," and the like, whether or not the elements described as being adjacent to each other are in physical contact with each other.

DETAILED DESCRIPTION OF THE DRAWINGS

Portable music players, cell phones, and other portable electronic equipment have in recent years become almost ubiquitous. Many. such devices make use of headphones, recharging cables, microphones, and the like, many of which are connected to the portable electronic device by a cord or cords. In one embodiment of the invention, a cord management device comprises a body having a first end, a second end, a perimeter, and an interior bounded by the perimeter. The cord that is to be managed may be wrapped around the body of the cord management device in such a way as to control the length of the portion of the cord that is able to hang freely, thus protecting the entire cord. The cord management device further comprises an aperture spaced apart from the perimeter and extending through the interior of the body, the purpose of which will be further explained below, and still further comprises a recess in the interior of the body capable of receiving and storing an object attached to the cord.

Referring now to the figures, FIG. 1 is a perspective view of a cord management device 100, shown on an enlarged scale for clarity, according to an embodiment of the invention. As illustrated in FIG. 1, cord management device 100 comprises a body 110 having an end 111, an end 112 opposite end 111, a perimeter 113, and an interior 114 bounded by perimeter 113. More specifically, interior 114 comprises all of the surface area of body 110, including the surface area visible in FIG. 1 and also the surface area that is on a side of body 110 that is not visible in FIG. 1. As an example, cord management device 100 can be constructed of silicone or a similar material. In one embodiment, body 110 is solid, meaning there are no cavities therein. This excludes, of course, the various apertures and recesses that were introduced above and that are further described below.

Cord management device 100 further comprises an aperture 120 spaced apart from perimeter 113 and extending through interior 114 of body 110. As shown in a subsequent figure, and as further discussed below, aperture 120 is capable of receiving a portion of a cord or the like for the purpose of managing it using cord management device 100. In the illustrated embodiment, aperture 120 comprises a circular opening in interior 114 that extends into body 110. In a different embodiment, aperture 120 could have some other shape. In a particular embodiment, aperture 120 could simply be a terminal portion of a channel or slot such as a slot 130. In that particular embodiment, aperture 120 may or may not be enlarged beyond the width of such channel or slot.

In the embodiment illustrated in FIG. 1, aperture 120 is a first aperture of cord management device 100, and cord management device 100 further comprises an aperture 125, which is a second aperture of cord management device 100. Like aperture 120, aperture 125 is spaced apart from perimeter 113 and extends through interior 114 of body 110.

Slot 130, in the illustrated embodiment, extends between aperture 120 and perimeter 113. It may be said that aperture 120 communicates with slot 130 because slot 130 opens into aperture 120, as shown. Slot 130 is sized and positioned such that a portion of a cord may be introduced into slot 130 at perimeter 113 and slid along the length of slot 130 until the cord rests within aperture 120. Referring still to the illustrated embodiment, aperture 120 has a diameter 121, and slot 130 has a width 131, with diameter 121 being greater than width 131. The relative sizes just described make possible a potentially advantageous situation in which the cord to be managed, being only slightly smaller than width 131, passes with difficulty along slot 130 but moves freely through aperture 120. A potential advantage offered by such an arrangement is that the managed cord, which terminates in a hardware component larger than diameter 121, is unlikely to pass from aperture 120 through slot 130 unless deliberately caused to do so by a user of cord management device 100. The cord thus stays securely within aperture 120 until purposely removed. At the same time, the user is free to feed the managed cord through aperture 120 as needed or desired. In a different embodiment, aperture 120 is small enough to trap the managed cord such that it cannot move freely but instead must be pulled through aperture 120. One advantage offered by this different embodiment is that the managed cord may be easier to wrap around body 110 if the managed cord is constrained in the described manner.

In a non-illustrated embodiment, body 110 is lacking any slot analogous to slots 130 and 135. In that non-illustrated embodiment, aperture 120 must be large enough to admit the passage of any hardware component attached to an end of the managed cord. In order to admit the passage of such hardware component, yet still be capable of maintaining the managed cord within aperture 120 at all times that such is desired, the non-illustrated embodiment comprises a flexible membrane or the like within aperture 120 and having a sub-aperture with a sub-diameter smaller than the hardware component. The flexible membrane is sufficiently rigid so as admit the passage of the hardware component only with some difficulty, such that the hardware component is unlikely to pass through the flexible membrane unless caused to do so by a user of cord management device 100.

Cord management device 100 still further comprises a recess 140 in interior 114 of body 110. Recess 140, as will be shown in a subsequent figure, is capable of or suitable for receiving an object that is attached to an end of the cord that is being managed by cord management device 100. As an example, such object can be ear buds, earphones, or another portion of a headphone set, a connector tip for a power cord or a recharging cable, or the like.

In the illustrated embodiment, recess 140 forms a passageway that extends completely through body 110. In a non-illustrated embodiment, recess 140 could extend only partway through body 110. Also in the illustrated embodiment, recess 140 is a first recess of cord management device 100, and cord management device 100 further comprises a recess 150, which is a second recess in interior 114 of body 110. Having two such recesses as illustrated in FIG. 1 may be advantageous for managing headphone cords and the like where the object at an end of the cord comprises, for example, two separate ear buds or the like, each of which can be received by one of recesses 140 and 150, as will be further illustrated in a subsequent figure.

As an example, recess 140 and recess 150 can be spaced apart from each other, as illustrated, and a portion of interior 114 forms a bridge 145 that stretches between recess 140 and recess 150. As another example, aperture 120 can be adjacent to recess 140, and aperture 125 can be adjacent to recess 150, as shown.

Also in the illustrated embodiment, body 110 comprises a slot 135, which can be similar to slot 130, associated with aperture 125. Aperture 120, recess 140, and slot 130 are located at end 111 of body 110, while aperture 125, recess 150, and slot 135 are located at end 112 of body 110.

Still referring to FIG. 1, body 110 of cord management device 100 further comprises a middle portion 117 located between end 111 and end 112. Middle portion 117 is narrower than ends 111 and 112, giving cord management device 100, in the illustrated embodiment, an hourglass or figure-eight shape. Notwithstanding the illustration, the result of a narrow middle portion like that just described is could also be any of a number of shapes characterized generally by opposing end portions that are broader or wider than a middle portion located between the end portions. It should be understood that the narrowing can occur in any of the three dimensions or axes of cord management device 100. This mention of such axes is the first that occurs herein; the axes are fully introduced in the following paragraph.

Body 110 has a first axis 170, a second axis 180 that is perpendicular to first axis 170, and a third axis 190 that is perpendicular to both first axis 170 and second axis 180. First axis 170 is a long axis of body 110, and a length of body 110 is measured along or parallel to first axis 170. A width and a thickness of body 110 are measured, respectively, along or parallel to second axis 180 and third axis 190. As an example, body 10 has a thickness 191.

In the illustrated embodiment, recesses 140 and 150 and apertures 120 and 125 all lie substantially on first axis 170. In a different embodiment, at least one of recesses 140 and 150 and apertures 120 and 125 can be located off first axis 170. In the same or another embodiment, body 110 is symmetric about first axis 170, about second axis 180, or both. Such symmetry may or may not extend to the placement of apertures 120 and 125 and/or slots 130 and 135.

Figure 2:
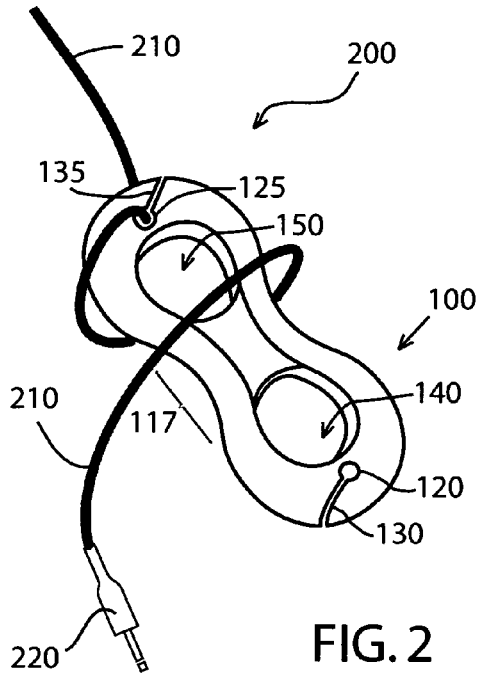
FIG. 2 is a perspective view of a cord management system according to an embodiment of the invention.

FIG. 2 is a perspective view of a cord management system 200 according to an embodiment of the invention. As illustrated in FIG. 2, one of the components of cord management system 200 is cord management device 100 that was first shown in FIG. 1. In addition, cord management system 200 comprises an object (not shown in FIG. 2) such as headphone ear buds or the like. The other end of cord 210, in the illustrated embodiment, terminates in a connector tip 220 that may be coupled to an MP3 player or other music player, a cell phone, a PDA, or the like. As suggested and partially shown by FIG. 2, middle portion 117 is capable of supporting cord 210 as cord 210 is wrapped on or around cord management device 100.

FIG. 2 also shows a portion of cord 210 in aperture 125, cord 210 having been placed therein, for example, in a manner such as was described above. With the portion of cord 210 in aperture 125, a different portion of cord 210 may easily be wrapped about middle portion 117 or a different section of cord management device 100. FIG. 2 depicts cord 210 after it has been passed a first time around middle portion 117.

Figure 3:
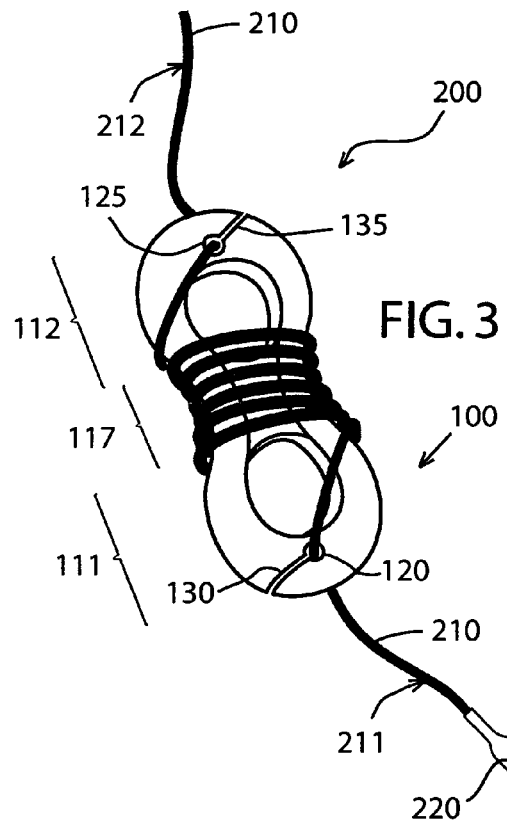
FIG. 3 is another perspective view of the cord management system of FIG. 2 according to an embodiment of the invention.

FIG. 3 is a perspective view of cord management system 200 after cord 210 has been passed several times around middle portion 117 according to an embodiment of the invention. Like FIG. 2, FIG. 3 depicts a portion of cord 210 in aperture 125. In addition, FIG. 3 depicts a different portion of cord 210 in aperture 120. With portions of cord 210 in apertures 102 and 125 and wrapped about middle portion 117, cord 210 is securely held on cord management device 100 in such a way as to be unlikely to get tangled or broken or to get caught on other objects.

A section 211 of cord 210 is not wrapped around middle portion 117 or located within aperture 120, but instead extends beyond end 111 of cord management device 100 and terminates at connector tip 220. Similarly, a section 212 of cord 210 extends beyond end 112 of cord management device 100 and terminates at an object that is not shown in FIG. 3 but that is shown in FIG. 4, described below.

The number of times cord 210 is wrapped around middle portion 117 depends on the desired lengths of sections 211 and 212, which were indicated above to be opposing free, unwrapped ends of cord 210. If longer free ends are desired, cord 210 is wrapped fewer times, while if shorter free ends are desired, cord 210 is wrapped a greater number of times. The greater width of ends 111 and 112 as compared to the width of middle portion 117 tends to keep the wrapped portion of cord 210 in place on cord management device 100.

Figure 4:
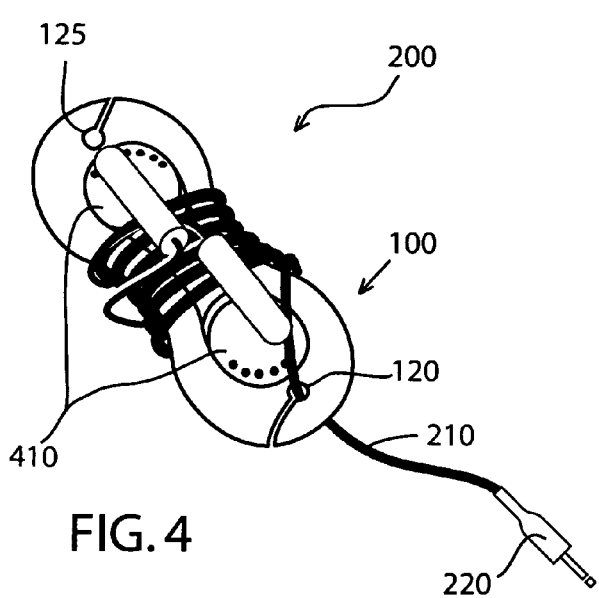
FIG. 4 is another perspective view of the cord management system of FIG. 2 according to an embodiment of the invention.

FIG. 4 is another perspective view of cord management system 200 according to an embodiment of the invention. The object referred to above as being located at an end of cord 210 is illustrated in FIG. 4 as an object 410. It was mentioned above that recesses 140 and 150 (see FIGS. 1-3) are capable of receiving a portion of object 410. FIG. 4 shows that portions of object 410, which in the illustrated embodiment comprises a pair of ear buds, are located within recesses 140 and 150. Thickness 191 of body 110 (see FIG. 1) is, in one embodiment, at least as great as the thickness of object 410.

As an example, a shape of recesses 140 and 150 can be complementary to a shape of object 410, and recesses 140 and 150 can be sized so as to form a friction fit with object 410. Object 410 thus fits snugly within recesses 140 and 150, and tends to stay in place until deliberately removed. As shown, when object 410 is stored in recesses 140 and 150, cord 210 may be removed from aperture 125.

Although the invention has been described with reference to specific embodiments, it will be understood by those skilled in the art that various changes may be made without departing from the spirit or scope of the invention. As just one example, the apertures and slots depicted and described herein may be replaced by analogous features that have a different appearance but perform the same functions. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the cord management device discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment of the invention, and may disclose alternative embodiments of the invention.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A cord a management device for a cord having two ear buds, the cord management device comprising:
    a body with a perimeter and comprising:
        a first section with a first recess, a first aperture, and a first slot coupled to the first aperture;
        a second section with a second recess, a second aperture, and a second slot coupled to the second aperture; and
        a middle section coupling together the first section and the second section,
    wherein:
    the first recess and the second recess are each configured to receive one of the two ear buds;
    the first slot extends between the first aperture and the perimeter and is sized and positioned such that a first portion of the cord can be inserted into the first slot at the perimeter;
    the second slot extends between the second aperture and the perimeter and is sized and positioned such that a second portion of the cord can be inserted into the second slot at the perimeter;
    a width of the middle section is less than a width of the first section and a width of the second section;
    a center of the first recess, a center of the first aperture, a center of the second recess, and a center of the second aperture lie substantially along a first axis of the body;
    the first axis of the body is substantially perpendicular to the width of the middle portion; and
    the first slot and the second slot do not lie along or intersect the first axis.

2. The cord management device of claim 1, wherein:
    the body has an hourglass shape.

3. The cord management device of claim 1, wherein:
    the first recess and the second recess are adjacent to the middle portion.

4. The cord management device of claim 1, wherein:
    the first recess and the second recess each have a first side and a second side opposite the first side;
    the first section is configured such that the first recess can receive a first ear bud of the two ear buds at the first side of the first recess; and
    the second section is configured such that the second recess can receive a second ear bud of the two ear buds at the first side of the second recess while the first recess is coupled to the first ear bud of the two ear buds at the first side of the first recess.

5. The cord management device of claim 1, wherein:
    each ear bud of the two ear buds comprises:
        a first portion configured to be placed in an ear of a user; and
        a second portion coupled to the cord and configured to be outside of the ear of the user when the first portion of the ear bud is placed in the ear of the user;

the first recess and the second recess each have a first side and a second side opposite the first side; and the second portion of a first ear bud of the two ear buds and the second portion of a second ear bud of the two ear buds can point toward each other, be collinear with each other, and lie substantially along the first axis of the body when the first ear bud of the two ear buds is coupled to the first recess at the first side of the first recess and the second ear bud of the two ear buds is coupled to the second recess at the first side of the second recess.

6. The cord management device of claim 1, wherein:
the body is symmetric about the first axis.

7. The cord management device of claim 1, wherein:
the first section is a reversed mirror image of the second section.

8. The cord management device of claim 1, wherein:
the first recess is substantially the same size as the second recess;
the first aperture is substantially the same size as the second aperture;
the first slot is substantially the same size as the second slot;
the first recess is larger than the first aperture; and
the first slot and the second slot have widths smaller than diameters of the first and second recesses and diameters of the first and second apertures.

9. The cord management device of claim 1, wherein:
the body is configured such that a third portion of the cord can be wrapped around the middle portion when the first portion of the cord is in the first aperture and the second portion of the cord is in the second aperture.

10. The cord management device of claim 1, wherein:
the body comprises a single material.

11. The cord management device of claim 1, wherein:
the first recess is sized to create a friction fit with a first ear bud of the two ear buds; and
the second recess is sized to create a friction fit with a second ear bud of the two ear buds.

12. An apparatus for managing a cord coupled to a first object and a second object, the apparatus comprising:
a first body portion having a first terminal portion, having a first opening in an interior of the first body portion and having a second opening that extends from a perimeter of the first body portion to the first terminal portion in the interior of the first body portion; and
a second body portion coupled to the first body portion and having a second terminal portion, having a third opening in an interior of the second body portion and having a fourth opening that extends from a perimeter of the second body portion to the second terminal portion in the interior of the second body portion, wherein:
the second and fourth openings are configured to receive different portions of the cord;
the first opening is configured to receive the first object coupled to the cord and has a shape complementary to a shape of the first object coupled to the cord;
the third opening is configured to receive the second object coupled to the cord and has a shape complementary to a shape of the second object coupled to the cord;
a thickness of the first body portion is approximately equal to a thickness of the first object coupled to the cord;
a thickness of the second body portion is approximately equal to a thickness of the second object coupled to the cord;
the apparatus has an hourglass shape;
a part of the first opening, a part of the first terminal portion, a part of the third opening, and a part of the second terminal portion lie substantially along a first axis of the body; and
a portion of the second opening at the perimeter of the first body and a portion of the fourth opening at the perimeter of the second body do not lie along or intersect the first axis.

13. The apparatus device of claim 12, wherein:
the first body portion and the second body portion are coupled together by a bridge; and
the first body portion and the second body portion are configured such that the cord can be wrapped around the bridge at a perimeter of the cord management device.

14. The apparatus of claim 13, wherein:
when the cord is wrapped around the bridge, the first opening can receive the first object coupled to the cord and the third opening can receive the second object coupled to the cord.

15. The apparatus of claim 12, wherein:
the second body portion is a reversed mirror image of the first body portion.

16. The apparatus of claim 12, wherein:
a distance between the second opening and the fourth opening is greater than a distance between the first opening and the fourth opening.

17. The apparatus of claim 12, wherein:
the first opening is sized to create a friction fit with the first object coupled to the cord; and
the third opening is sized to create a friction fit with a second object coupled to the cord.

18. A cord management device for a cord with two headphones, the cord management device comprising:
a body with a perimeter and an interior bounded by the perimeter, the body comprising:
a first side;
a second side opposite the first side;
a first end with a first recess extending from the first side to the second side, a first aperture extending from the first side to the second side, and a first slot coupled to the first aperture and extending from the first side to the second side;
a second end with a second recess extending from the first side to the second side, a second aperture extending from the first side to the second side, and a second slot coupled to the second aperture and extending from the first side to the second side; and
a middle portion coupling the first end to the second end, wherein:
the first slot couples the first aperture to the perimeter of the body and is sized and positioned such that a first portion of the cord can be introduced into the first slot at the perimeter of the body;
the second slot couples the second aperture to the perimeter of the body and is sized and positioned such that a second portion of the cord can be introduced into the second slot at the perimeter of the body;
the body has a figure eight shape;
the first recess and the second recess are adjacent to the middle portion;
a center of the first recess, a center of the first aperture, a center of the second recess, and a center of the second aperture lie substantially along a first axis of the body;
the first slot and the second slot do not lie along or intersect the first axis of the body;
the first end is a reversed mirror image of the second end;

the first recess is substantially the same size as the second recess;

the first aperture is substantially the same size as the second aperture;

the first slot is substantially the same size as the second slot;

the first recess is larger than the first aperture;

the first end is configured such that the first recess can receive a first headphone of the two headphones at the first side of the body;

the first recess is sized so as to create a friction fit with the first headphone of the two headphones when the first recess receives the first headphone of the two headphones at the first side of the body;

the second end is configured such that the second recess can receive a second headphone of the two headphones at the first side of the body while the first recess is coupled to the first headphone of the two headphones at the first side of the body;

the second recess is sized so as to create a friction fit with the second headphone of the two headphones when the second recess receives the second headphone of the two headphones at the first side of the body; and the body is configured such that a third portion of the cord can be wrapped around the middle portion when the first portion of the cord is in the first aperture and the second portion of the cord is in the second aperture.

19. A cord management device for a cord having two ear buds, the cord management device comprising:

a body with a perimeter and comprising:

a first section with a first recess, a first aperture, and a first slot coupled to the first aperture;

a second section with a second recess, a second aperture, and a second slot coupled to the second aperture; and a middle section coupling together the first section and the second section, wherein:

the first recess and the second recess are each configured to receive one of the two ear buds;

the first slot extends between the first aperture and the perimeter and is sized and positioned such that a first portion of the cord can be inserted into the first slot at the perimeter;

the second slot extends between the second aperture and the perimeter and is sized and positioned such that a second portion of the cord can be inserted into the second slot at the perimeter;

a portion of the first recess, a portion of the first aperture, a portion of the second recess, and a portion of the second aperture lie substantially along a first axis of the body; and the first slot does not lie along or intersect the first axis.

20. The cord management device of claim 19, wherein:

the first and second recess are symmetrical with each other;

the first and second aperture are symmetrical with each other; and the first and second slots are symmetrical with each other.

21. The cord management device of claim 19, wherein:

a diameter of the first aperture, a diameter of the second aperture, a width of the first slot, and a width of the second slot are smaller than a diameter of the first recess and a diameter of the second recess.

22. A cord management device for a cord having two ear buds, the cord management device comprising:

a body with a perimeter and comprising:

a first section with a first recess, a first aperture, and a first slot coupled to the first aperture;

a second section with a second recess, a second aperture, and a second slot coupled to the second aperture; and a middle section coupling together the first section and the second section, wherein:

the first recess and the second recess are each configured to receive one of the two ear buds;

the first slot extends between the first aperture and the perimeter and is sized and positioned such that a first portion of the cord can be inserted into the first slot at the perimeter;

the second slot extends between the second aperture and the perimeter and is sized and positioned such that a second portion of the cord can be inserted into the second slot at the perimeter;

a width of the middle section is less than a width of the first section and a width of the second section;

a portion of the first recess, a portion of the first aperture, a portion of the second recess, and a portion of the second aperture tie substantially along a first axis of the body; and the first slot and the second slot do not lie along or intersect the first axis.

23. The cord management device of claim 22, wherein:

the first recess is sized to create a friction fit with a first ear bud of the two ear buds; and the second recess is sized to create a friction fir with a second ear bud of the two ear buds.

* * * * *

UNITED STATES PATENT AND TRADEMARK OFFICE
CERTIFICATE OF CORRECTION

PATENT NO. : 7,610,661 B2  Page 1 of 1
APPLICATION NO. : 11/349765
DATED : November 3, 2009
INVENTOR(S) : Sween et al.

It is certified that error appears in the above-identified patent and that said Letters Patent is hereby corrected as shown below:

At column 10, line 7, delete "recess" and insert --recesses--

At column 10, line 8, delete "aperture" and insert --apertures--

At column 10, line 40, delete "tie" and insert --lie--

At column 10, line 47, delete "fir" and insert --fit--

Signed and Sealed this

Sixteenth Day of March, 2010

David J. Kappos
*Director of the United States Patent and Trademark Office*